(12) United States Patent
Kardonik et al.

(10) Patent No.: US 10,997,140 B2
(45) Date of Patent: May 4, 2021

(54) METHOD AND APPARATUS FOR ACCELERATION OF HASH-BASED LOOKUP

(71) Applicant: NXP USA, Inc., Austin, TX (US)

(72) Inventors: Michael Kardonik, Austin, TX (US); David Philip Lapp, Ottawa (CA)

(73) Assignee: NXP USA, INC., Austin, TX (US)

(*) Notice: Subject to any disclaimer, the term of this patent is extended or adjusted under 35 U.S.C. 154(b) by 280 days.

(21) Appl. No.: 16/119,384

(22) Filed: Aug. 31, 2018

(65) Prior Publication Data

US 2020/0073952 A1  Mar. 5, 2020

(51) Int. Cl.
*G06F 17/30* (2006.01)
*G06F 16/22* (2019.01)
*G06F 16/2455* (2019.01)

(52) U.S. Cl.
CPC .... *G06F 16/2255* (2019.01); *G06F 16/24552* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 6,324,581 B1* | 11/2001 | Xu | H04L 29/06 709/229 |
| 6,848,029 B2 | 1/2005 | Coldewey | |
| 8,166,277 B2 | 4/2012 | Arimilli et al. | |
| 10,891,535 B1* | 1/2021 | Mancuso | H04L 63/0428 |
| 2004/0133747 A1* | 7/2004 | Coldewey | G06F 12/0862 711/137 |
| 2005/0114461 A1* | 5/2005 | Shirai | G06Q 10/107 709/207 |
| 2006/0271482 A1* | 11/2006 | Bito | H04L 9/3297 705/50 |
| 2007/0174555 A1 | 7/2007 | Burtscher et al. | |
| 2007/0282573 A1* | 12/2007 | Fritz | G06F 40/14 703/2 |
| 2008/0052488 A1* | 2/2008 | Fritz | G06F 12/0864 711/216 |
| 2012/0198121 A1* | 8/2012 | Bell, Jr. | G06F 12/1036 711/3 |
| 2016/0070701 A1* | 3/2016 | Lim | G06F 16/2255 707/747 |
| 2017/0031823 A1* | 2/2017 | Ross | G06F 12/0862 |
| 2017/0323087 A1* | 11/2017 | Kline | H04L 9/0869 |
| 2019/0377683 A1* | 12/2019 | Polychroniou | G06F 12/0891 |

* cited by examiner

*Primary Examiner* — Hung D Le

(57) ABSTRACT

A hash accelerator is provided that receives a hash key value from a processor core, determines a main memory address storing a hash table entry corresponding to the hash key value, and causes the hash table entry to be stored in a cache memory accessible by the processor core. The hash accelerator is configured to execute the same hash function that the processor core executes, and if the hash accelerator is faster than the software executing on the processor core, the hash table entry can be available to the core processor from cache memory by the time the processor core attempts to access the entry. This avoids a cache miss by the processor core, thereby improving overall efficiency of routines executed by the processor core.

18 Claims, 4 Drawing Sheets

METHOD AND APPARATUS FOR ACCELERATION OF HASH-BASED LOOKUP

BACKGROUND

Field

This disclosure relates generally to hash-based table lookup, and, more specifically, to providing a hardware accelerator to perform hash table lookups in order to improve overall system performance.

Related Art

In computing, a hash table is a data structure that implements an associative array abstract data type, which maps keys to values. A hash function is used to compute an index into an array of buckets or slots, from which the desired value can be found. One reason for using a hash table is that the average cost for each lookup is independent of the number of elements stored in the table, excluding conflicts.

Hash tables are therefore used in many kinds of computer software applications, particularly for associative arrays, database indexing, caches, and sets. For example, a network router can use a hash table data structure for storage of a forwarding information base (FIB) routing table that links content names with an output interface. A hash of the content name can be used during packet forwarding as an index to the table containing the content name/output interface pairs.

For many applications involving multiple hash table lookups, efficiency in accessing the memory location associated with a hash table entry is important. A principal performance issue in algorithms using hash table lookups relates to cache misses that a core experiences in accessing tables stored in main memory. If an entry is not present in a cache accessible by a processor, then the processor must access the entry from the main memory, thereby incurring memory latency. Main memory access latency can involve twice as many cycles as all the rest of the processing for a task. It is therefore desirable to avoid main memory accesses latency due to cache misses.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a hash accelerator that receives a hash key value from a processor core, determines a main memory address storing a hash table entry corresponding to the hash key value, and causes the hash table entry to be stored in a cache memory accessible by the processor core. The hash accelerator is configured to execute the same hash function that the processor core executes, and if the hash accelerator is faster than the software executing on the processor core, the hash table entry can be available to the core processor from cache memory by the time the processor core attempts to access the entry. This avoids a cache miss by the processor core, thereby improving overall efficiency of routines executed by the processor core.

Embodiments of the present invention provide improvements in processor core program execution efficiency by using the hash accelerator to prefetch hash table entries to a cache memory accessible by the processor core. Both the hash accelerator and the processor core execute the same hash function, but the hash accelerator, as a specialized processor to configured to compute the hash function, is intended to complete the hash calculation before the processor core and thereby can cause the hash table entry to be stored in the cache memory before the processor core attempts to access the entry.

The hash accelerator can be flexibly configured to provide hash table lookups in tables of differing sizes, table entries of differing sizes, and differing memory locations. The hash accelerator can also be configured to execute differing hash functions, depending upon the needs of the application. Implementation of these flexible attributes will be discussed in more detail below.

Figure 1:
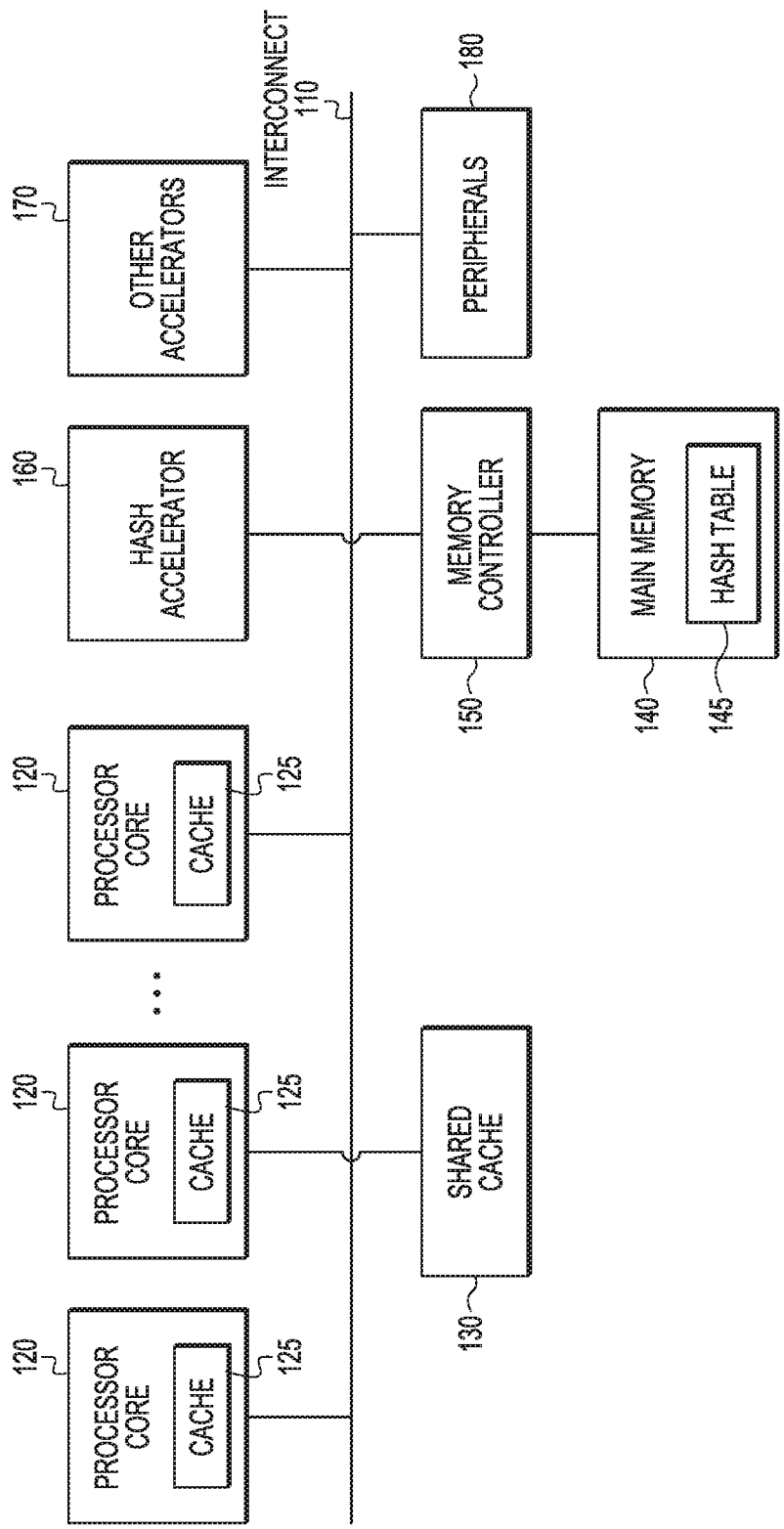
FIG. 1 is a simplified block diagram illustrating a multi-core processor incorporating a hash accelerator in accord with embodiments of the present invention.

FIG. 1 is a simplified block diagram illustrating a multi-core processor 100 incorporating a hash accelerator in accord with embodiments of the present invention. A system interconnect communicatively couples all illustrated components of the multi-core processor. A set of processor cores 120 are coupled to system interconnect 110. Each processor core includes at least one local cache memory 125. Local cache memory 125 can store program instructions and data that are used repeatedly in the operation of programs or information that the associated processor core is likely to need next. Local cache memory 125 can include, for example, L1 and L2 levels of cache memory. The processor core can access the information more quickly from the cache memory than retrieving the information from the main memory, thereby increasing the overall speed of program execution. In addition, a shared cache 130 is coupled to processor cores 120 via system interconnect 110. This multilevel cache still provides faster access to data than accessing the main memory, but can store information that is less used by the processor cores. In addition, as illustrated, shared cache 130 is accessible to all the processor cores and therefore can store information usable by each processor core.

Main memory 140 is also coupled to the system interconnect 110 and accessible via a memory controller 150. The main memory is typically random-access memory (RAM) in which the operating system and application programs are stored. As illustrated, one or more hash tables 145 are stored in main memory 140.

Hash accelerator 160 is communicatively coupled to processor cores 120, shared cache 130, and memory controller 150 and main memory 140 via the system interconnect 110. Through this communicative connection any of the processor cores can provide instructions to the hash accelerator, as will be discussed in greater detail below. In addition to the hash accelerator, other accelerators 170 and peripherals or peripheral controllers 180 can be communicatively coupled to interconnect 110. Accelerators 170 can include, for example, circuitry to perform security tasks, queue management, and buffer management. Peripherals 180 can include, for example, circuitry to perform power management, flash management, interconnect management, USB, and other PHY type tasks.

Figure 2:
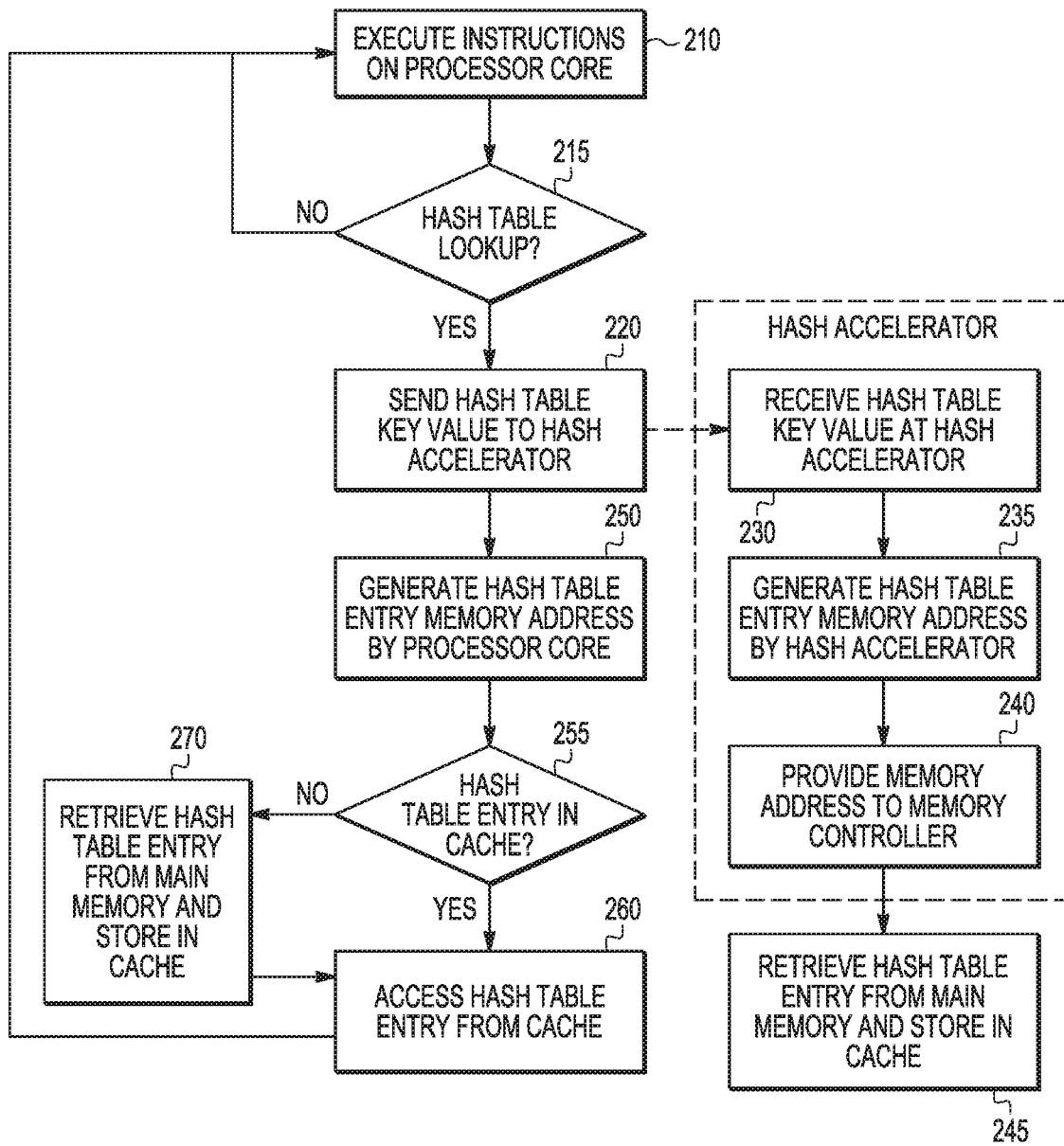
FIG. 2 is a simplified flow diagram illustrating interaction between a processor core and the hash accelerator in accord with one embodiment of the present invention.

FIG. 2 is a simplified flow diagram 200 illustrating interaction between a processor core and the hash accelerator in accord with one embodiment of the present invention. A processor core (e.g., one of processor cores 120) executes a series of program instructions (210). These instructions are suitable to the application but will include instructions to perform a hash table lookup. One example of such an application is performing lookups in a forwarding information base table in a network router in order to resolve processing needs of incoming packets and the packets' destination.

When a determination is made that a hash table lookup is necessary (215), the processor core sends a hash table key value associated with the lookup to the hash accelerator (e.g., hash accelerator 160) (220). Prior to this, as the processor core is initialized to execute the program instructions, the processor core sends to the hash accelerator information regarding the hash table that the hardware accelerator will be performing lookups on. This is performed once per table. Such information can include, for example, the base memory address of the hash table in the main memory, a size of each entry in the hash table, a size of the lookup table (e.g., number of entries), portion of entry load into cache, hash function selection, and configuration of the subset of the hash result to use in addressing the entry. This information can be used by the hash accelerator to calculate the memory location of the lookup table entry, as well as how to mask the bits generated by the hash function executed by the hash accelerator, and to identify hash function type.

The hash accelerator circuitry receives the hash table key value sent by the processor core (230). In alternate embodiments, the hash table key value can be provided to the hash accelerator by other devices, including, for example, an Ethernet controller. As illustrated in FIG. 1, one way this communication of the hash table key value (and other parameters necessary to the hash table calculation discussed above) is performed is by using the system interconnect of a multi-core processor (e.g., interconnect 110). In other configurations, the processor core can communicate with the hash accelerator via a dedicated communication coupling or a secondary interconnect, for example. The hash accelerator then generates a hash table entry memory address using the hash table key value, a hashing function, and other table parameters (235), as will be discussed in greater detail below. The hash accelerator then provides the calculated memory address to the memory controller for retrieval (240). The memory controller then retrieves the hash table entry from the main memory location and provides the data to the cache for storage (245). The data can be stored in any memory accessible to the processor core that originally sent the hash table key value to the hash accelerator (e.g., shared cache 130 or a local cache 125).

After transmitting the hash table key value to the hash accelerator, the processor core will generate the hash table entry memory address as well (250). The processor core and the hash accelerator will generate the hash table entry memory address using the same hashing algorithm. To provide flexibility, the hash accelerator can be hard coded to provide multiple hash functions, which can be selected by the processor core during program initialization or when the processor core provides the hash table key value to the hash accelerator. Alternatively, the hash accelerator can provide programmable circuitry (e.g., FPGA logic) that can be programmed to perform specialized hash functions selected by the user of the processing system.

Once the processor core has generated the hash table entry memory address, the processor core will determine whether the hash table memory address information has been stored in a cache accessible to the processor core (255). If so, then the processor core will access the hash table entry information from the cache memory (260). Therefore, use of the hash accelerator provides the hash table entry information to the cache memory prior to the attempted access by the processor core, thereby saving cycles associated with accessing main memory. If, however, the hash table entry is not present in the cache memory (e.g., the hash accelerator does not complete the lookup prior to access by the processor core), then the processor core proceeds to access the hash table entry from the main memory (e.g., 140, 145) (270), which will load the entry into the processor core's cache where the processor core can access the entry.

Figure 3:
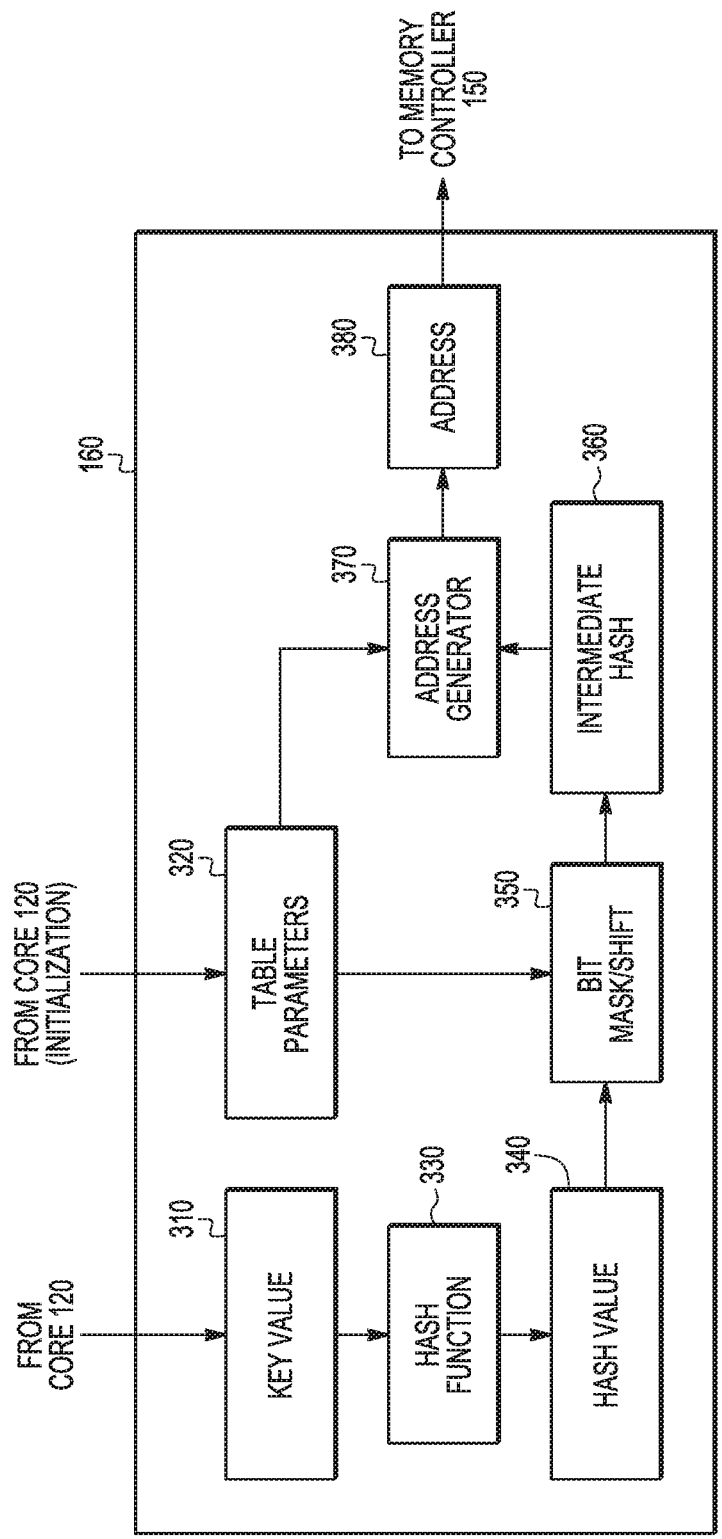
FIG. 3 is a simplified block diagram illustrating one embodiment of hash accelerator in accord with embodiments of the present invention.

FIG. 3 is a simplified block diagram illustrating one embodiment of hash accelerator 160 in accord with embodiments of the present invention. The hash accelerator includes a key value register 310 and table parameters registers 320. As discussed above, the processor core provides information associated with the hash table, such as entry size, table size, and base memory address of the table during initialization. These values are used to control various aspects of generating the lookup address of the table. The key value is the search key that will be subject to the hash in performing the table lookup.

Data in key value register 310 is provided to circuitry that performs the hash function 330 to generate a hash value which is provided to hash value register 340. Hash function circuitry 330 can take a variety of forms depending upon the desired flexibility of the hash accelerator. In some applications, one hash function is desirable and thus hash function circuitry 330 is hard coded to perform the one hash function. In other applications, there may be multiple hash functions that can be desired for the multi-core processor to perform. Each of these hash functions can be hard coded in hash function circuitry 330 and then the desired hash function can be selected either during initialization of the hash accelerator or by the processor core or during a call to the hash accelerator by the processor core. In these cases, an additional register can be provided to store an identifier of the desired hash function. In still other applications, it may be desirable to provide an ability for an end user to program their own hash function operable by the hash accelerator. In this case, hash function circuitry 330 can include circuitry programmable to provide the desired hash functions. This can include, for example, one or more field programmable gate arrays and the like. Embodiments of the present invention are not limited by the nature of the hash function circuitry.

The data in hash value register 340 is provided to bitmask/shift circuitry 350 to generate an intermediate hash value that is stored in intermediate hash register 360. Bitmask/Shift circuitry 350 uses some of the information in table parameters registers 320 to conform the hash value to the number and selection of bits needed to perform the hash table lookup. For example, the hash value calculation can generate a 64-bit value, but the hash table may only need 8 bits to determine the lookup value. Thus, the 64-bit value is masked and otherwise reduced to the needed 8 bits, which is stored in the intermediate hash register.

The intermediate hash value is then used by address generator circuitry 370 to generate a memory address 380 containing the desired entry from the lookup table stored in main memory. The address generator uses both the intermediate hash value from intermediate hash register 360 and table parameter data stored in table parameters registers 320 to generate the memory address. Such table parameters information can include the base address of the hash table (e.g., hash table 145) and the size of the entries in the hash table, and the like. Once generated, memory address 380 can be provided to the memory controller that accesses the main memory storing the hash table.

Figure 4:
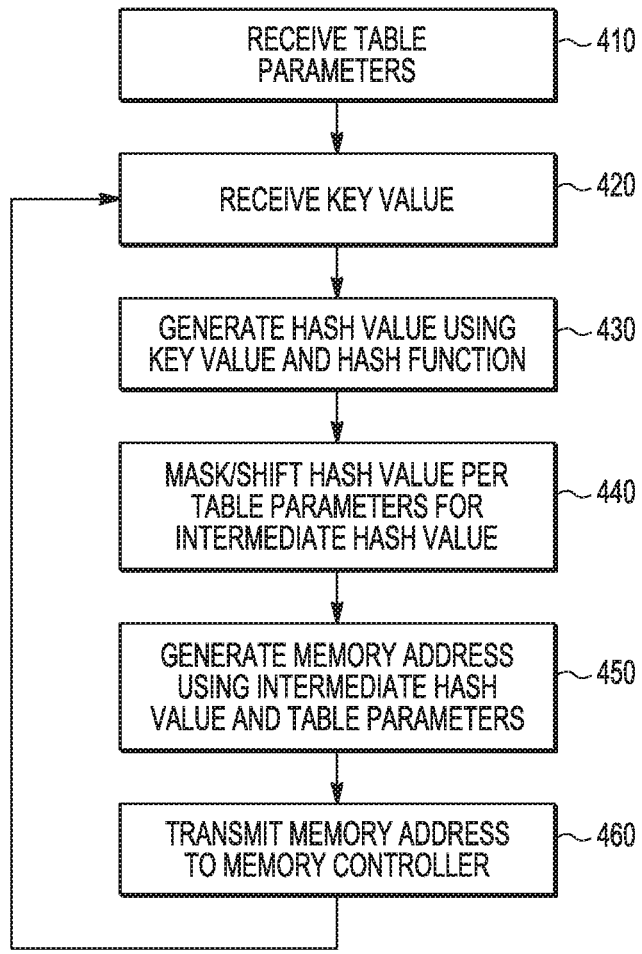
FIG. 4 is a simplified flow diagram illustrating functions executed by a hash accelerator in accord with embodiments of the present invention.

FIG. 4 is a simplified flow diagram 400 illustrating functions executed by a hash accelerator (e.g., hash accelerator 160) in accord with embodiments of the present invention. As discussed above, during initialization of routines at the processor core(s), the hash accelerator receives one or more table parameters (410). These table parameters can define the size of the table and the entries therein, along with identifying a type of hash function to execute (if the hash accelerator is configured to execute multiple hash functions).

When the processor core has determined a key value for the hash function, the processor core provides the key value to the hash accelerator, which receives key value (420) and stores the key value in a register (e.g., key value register 310). In addition, an identifier of the processor core that supplied the key value may also be received and stored by the hash accelerator. The hash accelerator then uses the default hash function or a selected hash function to generate a hash value from the key value (430). The hash accelerator then performs masking/shifting operations on the hash value to generate an intermediate hash value (440). The masking/shifting operations are determined using one or more of the table parameters provided during the initialization steps (e.g., 410). A memory address of the hash table entry is generated using the intermediate hash value and one or more of the table parameters (e.g., table base address and entry size) (450). The memory address is then provided to a memory controller (460) to retrieve the information from main memory and provide the information to an appropriate cache memory associated with the processor core that originally provided the key value. The hash accelerator can then receive another key value for the next hash function calculation (420).

Through the use of the hash accelerator provided by embodiments of the present invention, the overall efficiency of operations involving hash table lookup by a processor incorporating the hash accelerator is improved. The processor core can calculate the memory address of the hash table entry and that information will be stored already in a cache memory accessible to the processor core, due to the previous retrieval by the hash accelerator.

By now it should be appreciated that there has been provided a processing device including a processor core, a memory, and a hash accelerator. The processor core is coupled to a cache memory and is configured to execute one or more instructions to perform a core-based hash table lookup using a key value. The memory stores entries of the hash table and is coupled to the processor core. The hash accelerator is also coupled to the processor core, the memory, and the cache memory, and is configured to perform an accelerator-based hash table lookup. The hash accelerator is configured to receive the key value from the processor core, determine an address of the memory storing an entry of the hash table corresponding to the key value, and cause the entry of the hash table to be stored in the cache memory.

In one aspect of the above embodiment, the hash accelerator determines the address of the memory by being configured to calculate a hash value using a hash function and the key value, perform one or more of a bitmask and a shift on the hash value of generate an intermediate hash value, and generate the address of the memory using the intermediate hash value and one or more parameters associated with the hash table. In a further aspect, the hash accelerator includes a key value register configured to store the key value, and one or more table parameter registers configured to store the corresponding one or more parameters associated with the hash table. In another further aspect, the hash accelerator includes hash function circuitry configured to calculate the hash value using the key value. In yet a further aspect, the hash function circuitry includes circuitry configured to calculate a plurality of available hard coded hash-functions, where the processor core selects the hash function from the plurality of available hash functions. In another further aspect, the hash function circuitry includes circuitry configured to calculate a user programmed hash function, where the circuitry includes a field programmable gate array. In another aspect, the one or more parameters associated with the hash table include one or more of a base address of the hash table, an entry size of the hash table, a size of the hash table, and an identifier of the hash table.

In another aspect, the processor core is configured to perform the core-based hash table lookup by determine the address of the memory storing the entry of the hash table corresponding to the key value, and access the entry of the hash table stored in the cache memory, where the entry of the hash table stored in the cache memory was previously stored in the cache memory in response to the accelerator-based hash table lookup. In yet another aspect, the processor core is further configured to perform the core-based hash table lookup by determining the address of the memory storing the entry of the hash table corresponding to the key value, and access the entry of the hash table stored in the cache memory if the accelerator-based hash table lookup is completed prior to accessing, and access the entry of the hash table from the memory, if the accelerator-based hash table lookup is not completed prior to said accessing. In yet another aspect, the processing device further includes a memory controller coupled to the memory, the processor core, and the hash accelerator. The memory controller is configured to access information stored in the memory in response to commands from the processor core and the hash accelerator.

Another embodiment provides a method for performing a hash table lookup. The method includes receiving a key value for the hash table lookup by a hash accelerator from a processor core, determining a memory address that stores an entry of the hash table corresponding to the key value, and providing the memory address from the hash accelerator to a memory controller. The determining includes providing the key value to a hash function. The providing causes the memory controller to retrieve the entry of the hash table and provide the entry to a cache memory accessible to the processor core.

One aspect of the above embodiment provides for determining, by the processor core, a memory address that stores the entry of the hash table corresponding to the key value and accessing the entry of the hash table stored in the cache memory. The determining includes providing the key value to a hash function calculated by the processor core. The entry of the hash table stored in the cache memory is previously provided to the cache memory in response to the hash accelerator providing the memory address to the memory controller. In a further aspect, determining the memory address by the processor core begins at or after determining the memory address by the hash accelerator begins.

In another aspect of the above embodiment, determining the memory address by the hash accelerator includes calculating a hash value using the hash function and the key value, generating an intermediate hash value by performing one or more of a bitmask and a shift on the hash value, and generating the memory address using the intermediate hash value and one or more parameters associated with the hash table. In a further aspect, the one or more parameters associated with the hash table comprise one or more of a base address of the hash table, an entry size of the hash table, a size of the hash table, and an identifier of the hash table. In another further aspect, determining the memory address by the hash accelerator further includes selecting the hash function from a plurality of available hard-coded hash functions, where the processor core selects the hash function from the plurality of available hash functions. In still another further aspect, determining the memory address by the hash accelerator further includes configuring circuitry in the hash accelerator to calculate a user-programmed hash function, where the circuitry includes a field programmable gate array.

Another embodiment provides a processing device that includes: a main memory storing entries of a hash table; a processor core, coupled to a cache memory and the main memory, and configured to execute one or more instructions to perform a core-based hash table lookup; and a hash accelerator, coupled to the processor core, the main memory, and the cache memory, where the hash accelerator performs an accelerator-based hash table lookup. The processor core performs the hash table lookup by being configured to acquire a key value associated with the hash table and determine an address of the main memory storing an entry of the hash table corresponding to the key value. The hash accelerator performs the accelerator-based hash table lookup by being configured to receive the key value from the processor core, determine the address of the main memory storing the entry of the hash table corresponding to the key value, and cause the entry of the hash table to be stored in the cache memory. The processor core is further configured to access the entry of the hash table from the cache memory if the entry of the hash table is stored in the cache memory prior to the processor core accessing the entry, and access the entry of the hash table from the main memory if the entry of the hash table is not stored in the cache memory prior to the processor core accessing the entry.

In one aspect of the above embodiment, the processor core is configured to provide the key value to the hash accelerator prior to the processor core determining the address of the main memory storing the entry of the hash table corresponding to the key value. In another aspect of the above embodiment, determining the address of the main memory storing the entry of the hash table corresponding to the key value by the processor core and the hash accelerator includes calculating a hash value using a hash function and the key value, where the processor core and the hash accelerator calculate the same hash function.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. For example, main memory 140 may be located on a same integrated circuit as processor cores 120 or on a separate integrated circuit or located within another peripheral or slave discretely separate from other elements of system 100. Peripherals 180 may also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of an operation, and the order of operations may be altered in various other embodiments.

All or some of the software described herein may be received elements of system 100, for example, from computer readable media such as main memory 140 or other media on other computer systems. Such computer readable media may be permanently, removably or remotely coupled to an information processing system such as system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, and the like, just to name a few.

In one embodiment, system 100 is a computer system. Computer systems are information handling systems which can be designed to give independent computing power to one or more users. Computer systems may be found in many forms including but not limited to mainframes, minicomputers, servers, workstations, personal computers, notepads, personal digital assistants, electronic games, routers, switches, gateways, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the hardware accelerator can be configured to execute one or more hard coded hash functions or programmable hash functions. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A processing device comprising:
   a processor core, coupled to a cache memory, configured to execute one or more instructions to perform a core-based hash table lookup using a key value;
   a memory, coupled to the processor core, storing entries of the hash table;
   a hash accelerator, coupled to the processor core, the memory, and the cache memory, wherein the hash accelerator performs an accelerator-based hash table lookup by being configured to
      receive the key value from the processor core,
      determine an address of the memory storing an entry of the hash table corresponding to the key value, and
      cause the entry of the hash table to be stored in the cache memory,
   wherein the hash accelerator performs said determining the address of the memory by being further configured to
      calculate a hash value using a hash function and the key value;
      perform one or more of a bitmask and a shift on the hash value to generate an intermediate hash value; and
      generate the address of the memory using the intermediate hash value and one or more parameters associated with the hash table.

2. The processing device of claim 1 wherein the hash accelerator comprises:
   a key value register configured to store the key value; and
   one or more table parameter registers configured to store the corresponding one or more parameters associated with the hash table.

3. The processing device of claim 1 wherein the hash accelerator comprises:
   hash function circuitry configured to calculate the hash value using the key value.

4. The processing device of claim 3 wherein the hash function circuitry comprises:
   circuitry configured to calculate a plurality of available hard coded hash-functions, wherein the processor core selects the hash function from the plurality of available hash functions.

5. The processing device of claim 3 wherein the hash function circuitry comprises:
   circuitry configured to calculate a user programmed hash function, wherein the circuitry comprises a field programmable gate array.

6. The processing device of claim 1 wherein the one or more parameters associated with the hash table comprise one or more of a base address of the hash table, an entry size of the hash table, a size of the hash table, and an identifier of the hash table.

7. The processing device of claim 1, wherein the processor core is further configured to
   perform the core-based hash table lookup by determining the address of the memory storing the entry of the hash table corresponding to the key value; and
   access the entry of the hash table stored in the cache memory, wherein the entry of the hash table stored in the cache memory was previously stored in the cache memory in response to the accelerator-based hash table lookup.

8. The processing device of claim 1, wherein the processor core is further configured to
perform the core-based hash table lookup by determining the address of the memory storing the entry of the hash table corresponding to the key value;
access the entry of the hash table stored in the cache memory, if the accelerator-based hash table lookup is completed prior to said accessing; and
access the entry of the hash table from the memory, if the accelerator-based hash table lookup is not completed prior to said accessing.

9. The processing device of claim 1 further comprising:
a memory controller, coupled to the memory, the processor core, and the hash accelerator, and configured to access information stored in the memory in response to commands from the processor core and the hash accelerator.

10. A method for performing a hash table lookup, the method comprising:
receiving, by a hash accelerator, a key value for the hash table lookup from a processor core;
determining, by the hash accelerator, a memory address that stores an entry of the hash table corresponding to the key value, wherein said determining comprises providing the key value to a hash function;
providing the memory address, by the hash accelerator, to a memory controller, wherein said providing causes the memory controller to retrieve the entry of the hash table and provide the entry to a cache memory accessible to the processor core,
wherein said determining the memory address by the hash accelerator comprises:
calculating a hash value using the hash function and the key value;
generating an intermediate hash value by performing one or more of a bitmask and a shift on the hash value; and
generating the memory address using the intermediate hash value and one or more parameters associated with the hash table.

11. The method of claim 10 further comprising:
determining, by the processor core, a memory address that stores the entry of the hash table corresponding to the key value, wherein said determining comprises providing the key value to a hash function calculated by the processor core; and
accessing the entry of the hash table stored in the cache memory, wherein the entry of the hash table stored in the cache memory is previously provided to the cache memory in response to the hash accelerator providing the memory address to the memory controller.

12. The method of claim 11 wherein said determining the memory address by the processor core begins at or after said determining the memory address by the hash accelerator begins.

13. The method of claim 10 wherein the one or more parameters associated with the hash table comprises one or more of a base address of the hash table, an entry size of the hash table, a size of the hash table, and an identifier of the hash table.

14. The method of claim 10 wherein said determining the memory address by the hash accelerator further comprises:
selecting the hash function from a plurality of available hard-coded hash functions, wherein the processor core selects the hash function from the plurality of available hash functions.

15. The method of claim 10 wherein said determining the memory address by the hash accelerator further comprises:
configuring circuitry in the hash accelerator to calculate a user-programmed hash functions, wherein the circuitry comprises a field programmable gate array.

16. A processing device comprising:
a main memory storing entries of a hash table;
a processor core, coupled to a cache memory and the main memory, configured to execute one or more instructions to perform a core-based hash table lookup by being configured to
acquire a key value associated with the hash table,
determine an address of the main memory storing an entry of the hash table corresponding to the key value;
a hash accelerator, coupled to the processor core, the main memory, and the cache memory, wherein the hash accelerator performs an accelerator-based hash table lookup by being configured to
receive the key value from the processor core,
determine the address of the main memory storing the entry of the hash table corresponding to the key value, and
cause the entry of the hash table to be stored in the cache memory,
wherein the hash accelerator performs said determining the address of the memory by being further configured to
calculate a hash value using a hash function and the key value;
perform one or more of a bitmask and a shift on the hash value to generate an intermediate hash value; and
generate the address of the memory using the intermediate hash value and one or more parameters associated with the hash table; and
wherein the processor core is further configured to
access the entry of the hash table from the cache memory if the entry of the hash table is stored in the cache memory prior to the processor core accessing the entry, and
access the entry of the hash table from the main memory if the entry of the hash table is not stored in the cache memory prior to the processor core accessing the entry.

17. The processing device of claim 16 wherein the processor core is configured to provide the key value to the hash accelerator prior to the processor core performing said determining the address of the main memory storing the entry of the hash table corresponding to the key value.

18. The processing device of claim 16 wherein said determining the address of the main memory storing the entry of the hash table corresponding to the key value by the processor core and the hash accelerator comprises calculating a hash value using a hash function and the key value, wherein the processor core and the hash accelerator calculate the same hash function.

* * * * *